(12) United States Patent
Lee

(10) Patent No.: US 12,179,673 B2
(45) Date of Patent: Dec. 31, 2024

(54) VEHICLE CRADLE ASSEMBLY

(71) Applicant: HYUNDAI MOBIS Co., Ltd., Seoul (KR)

(72) Inventor: Kwan Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 305 days.

(21) Appl. No.: 17/856,750

(22) Filed: Jul. 1, 2022

(65) Prior Publication Data

US 2023/0119742 A1 Apr. 20, 2023

(30) Foreign Application Priority Data

Oct. 15, 2021 (KR) ........................ 10-2021-0137530

(51) Int. Cl.
| | | |
|---|---|---|
| *B60R 11/02* | (2006.01) | |
| *B60R 7/04* | (2006.01) | |
| *F16M 11/04* | (2006.01) | |
| *F16M 13/02* | (2006.01) | |
| *B60R 11/00* | (2006.01) | |

(52) U.S. Cl.
CPC ....... *B60R 11/0241* (2013.01); *F16M 11/041* (2013.01); *F16M 13/022* (2013.01); *B60R 7/04* (2013.01); *B60R 2011/0075* (2013.01)

(58) Field of Classification Search
CPC .. B60R 7/005; B60R 7/04; B60R 7/08; B60R 7/081; B60R 7/088; B60R 2011/0042; B60R 2011/0049; B60R 2011/0064; B60R 2011/007; B60R 2011/0066; B60R 2011/0071; B60R 2011/0073; B60R 2011/0075; B60R 2011/0077; B60R 2011/0078; B60R 2011/008; B60R 2011/0094; B60R 2011/0092; B60R 2011/0082; B60R 2011/0084; B60R 2011/0085; B60R 2011/0003; B60R 2011/0005; B60R 2011/0008; B60R 2011/0019; B60R 2011/0036; B60R 11/0241; B60R 11/06; B60R 11/02; B60R 11/0258; F16M 11/041; F16M 13/022
See application file for complete search history.

(56) References Cited

U.S. PATENT DOCUMENTS 5,855,310 A * 1/1999 Van Ert .................. B60R 11/06
224/543
8,505,794 B2 * 8/2013 Ardigo .................... B60R 7/08
224/543

(Continued)

*Primary Examiner* — Gregory A Blankenship
(74) *Attorney, Agent, or Firm* — Morgan, Lewis & Bockius LLP

(57) ABSTRACT

The present disclosure relates to a vehicle cradle assembly including a first support unit disposed on an inner surface of a cabin of a vehicle and configured to support an electronic component, an accessory, and a combination thereof, a cover disposed on an upper portion of the first support unit and configured to selectively open or close a front side of the first support unit, a winding unit disposed on the upper portion of the first support unit, coupled to an end of the cover, and configured to operate the cover to selectively open or close the front side of the first support unit, and a button unit fixed to the inner surface of the cabin of the vehicle and configured to control an operation of the winding unit by applying power to the winding unit.

13 Claims, 10 Drawing Sheets

(56) References Cited

U.S. PATENT DOCUMENTS

| | | | |
|---|---|---|---|
| 2008/0174136 A1* | 7/2008 | Welschholz | B60R 7/06 |
| | | | 296/37.12 |
| 2013/0193179 A1* | 8/2013 | Davidson | B60R 7/043 |
| | | | 224/584 |
| 2015/0350397 A1* | 12/2015 | Vourlat | H04B 1/3877 |
| | | | 455/575.9 |
| 2016/0257260 A1* | 9/2016 | Barre | H04M 1/04 |
| 2019/0381951 A1* | 12/2019 | Olar | B60R 7/043 |
| 2020/0398702 A1 | 12/2020 | Prozzi et al. | |
| 2022/0227305 A1* | 7/2022 | Wraith | B60R 11/02 |
| 2022/0388454 A1* | 12/2022 | Wronski | B60R 9/06 |
| 2023/0040098 A1* | 2/2023 | Hoogendoorn | B60R 11/06 |
| 2023/0119742 A1* | 4/2023 | Lee | B60R 11/00 |
| | | | 296/37.8 |
| 2023/0398943 A1* | 12/2023 | Iso | B60R 7/06 |

* cited by examiner

VEHICLE CRADLE ASSEMBLY

CROSS-REFERENCE TO RELATED APPLICATIONS

This application claims benefit of priority to Korean Patent Application No. 10-2021-0137530, filed on Oct. 15, 2021, the disclosure of which is incorporated herein by reference in its entirety.

BACKGROUND

1. Technical Field

The present disclosure relates to a vehicle cradle assembly, and more particularly, to a vehicle cradle assembly, in which various types of accessories may be applied to a cabin of a vehicle through customization, and damage to and breakage of the cabin of the vehicle and the various types of accessories may be reduced.

2. Related Art

In general, recently, with the development of various telecommunication facilities, lots of mobile phones that can always be carried for the convenience of users are widely used. In addition, with the development of the electronic industries, the sensitivity of electronic components has improved, and the size, weight, and volume of electronic components have been reduced. As a result, electronic components that can realize multifunction are commonly used.

In addition, cradles have been developed to securely fix these mobile phones and electronic components.

In addition, cradles have been developed to hold a table that allows a user to eat a simple meal in a cabin of a vehicle, a storage box that can store simple items, and an accessory such as a key holder.

The types of cradles include a cradle configured to hold an accessory by using a shape of a structure such as a crash pad and an air vent in the related art, a cradle configured to attach various types of accessories by using an adhesive tape, and a cradle configured to insert a structure suitable for a shape of a cup holder.

However, in the case of the cradle that uses a shape of a structure such as the crash pad and the air vent, there is a risk that the components of the cradle are damaged by forces that occur while the accessory is frequently attached to or detached from the cradle and forces that occurs while the accessory is mounted on the cradle.

Further, in the case of the cradle configured to hold the accessory by using the adhesive tape, the accessory is attached to an upper end of the crash pad and a component that may be vulnerable to adhesive substances. For this reason, there is a risk that the components of the cradle are damaged and broken at the time of attaching or detaching the accessory.

Accordingly, those skilled in the corresponding field seek to find a solution capable of suiting the needs of customers who want to apply various types of accessories to the cabin of the vehicle through customization and to find a solution capable of reducing damage to and breakage of the cabin of the vehicle and the various types of accessories. However, those skilled in the art have not obtained satisfactory results up to now.

SUMMARY

The present disclosure has been made in an effort to solve the above-mentioned problems, and an object of the present disclosure is to provide a vehicle cradle assembly capable of suiting the needs of customers who want to apply various types of accessories to a cabin of a vehicle through customization and reducing damage to and breakage of the cabin of the vehicle and the various types of accessories.

The above-mentioned object, other objects, advantages, and features of the present disclosure and methods of achieving the objects, advantages, and features will be clear with reference to embodiments described in detail below together with the accompanying drawings.

Various embodiments are directed to a vehicle cradle assembly including: a first support unit disposed on an inner surface of a cabin of a vehicle and configured to support an electronic component, an accessory, and a combination thereof; a cover disposed on an upper portion of the first support unit and configured to selectively open or close a front side of the first support unit; a winding unit disposed on the upper portion of the first support unit, coupled to an end of the cover, and configured to operate to the cover to selectively open or close the front side of the first support unit; and a button unit fixed to the inner surface of the cabin of the vehicle and configured to control an operation of the winding unit by applying power to the winding unit.

The first support unit may be fixed to a crash pad of the vehicle.

The first support unit may include: a body portion; and a plurality of fastening portions penetratively formed in the body portion so that the electronic component, the accessory, and the combination thereof are fastened to the fastening portions.

The winding unit may include: supports disposed at ends of the upper portion of the first support unit in a width direction of the vehicle; a rotary shaft having a first end and a second end respectively and rotatably coupled to the supports and configured to rotate forward or backward under a control of the button unit; and first coupling portions arranged in a longitudinal direction of the rotary shaft and configured to couple the end of the cover to the rotary shaft.

The first support unit may further include a coupling protrusion extending from a rear surface of the body portion in a direction opposite to a direction toward an occupant compartment, the coupling protrusion being coupled to the inner surface of the cabin of the vehicle.

The coupling protrusion may be fixed to an air vent of the vehicle.

Various embodiments are directed to a vehicle cradle assembly including: a first support unit slidably coupled to an inner surface of a cabin of a vehicle and configured to support an electronic component, an accessory, and a combination thereof; a cover disposed on an upper portion of the first support unit and configured to selectively open or close a front side of the first support unit; a winding unit disposed on the upper portion of the first support unit, coupled to an end of the cover, and configured to operate to the cover to selectively open or close the front side of the first support unit; an operation unit coupled to the first support unit and configured to move the first support unit forward or rearward relative to the cabin of the vehicle; and a button unit fixed to the inner surface of the cabin of the vehicle and configured to control an operation of the winding unit and an operation of the operation unit by applying power to the winding unit and the operation unit.

When second power is applied from an outside power source and the operation unit moves the first support unit rearward in a direction opposite to a direction toward an occupant, the winding unit may operate the cover to close the first support unit.

The first support unit may include: a body portion; a plurality of fastening portions penetratively formed in the body portion so that the electronic component or the accessory is fastened to the fastening portion; and a sliding portion extending from a rear surface of the body portion in a direction opposite to a direction toward an occupant compartment and slidably coupled to the inner surface of the cabin of the vehicle.

The operation unit may include: a drive part disposed on the inner surface of the cabin of the vehicle and configured to move the sliding portion forward or rearward when power is applied from an outside power source; and a gear part connected to the drive part and configured to be operated by an operation of the drive part.

The gear part may include: a pinion gear connected to the drive part and configured to rotate by receiving power from the drive part; and a first rack gear disposed at an end of the sliding portion and configured to engage with the pinion gear and move the sliding portion in a horizontal direction.

Various embodiments are directed to a vehicle cradle assembly including: a second support unit having an upper portion fixed to a cabin of a vehicle and configured such that an electronic component, an accessory, and a combination thereof are mounted on the second support unit; and a first fixing unit coupled to the cabin of the vehicle and the second support unit and configured to restrict a movement of the second support unit from the cabin of the vehicle by means of mutual coupling.

The second support unit may include: a second coupling portion fixed to the cabin of the vehicle; an extension portion extending downward from the second coupling portion; and a mounting portion bent from a lower end of the extension portion in a direction toward an occupant and configured to hold the electronic component, the accessory, and the combination thereof.

The first fixing unit may include: a first magnetic element fixed to the inner surface of the cabin of the vehicle; and a second magnetic element fixed to a position on the second support unit corresponding to a position of the first magnetic element.

According to the present disclosure, various types of accessories may be easily applied to the cabin of the vehicle through customization. Further, it is possible to prevent damage to and breakage of the components caused when the accessory is frequently attached or detached by using an adhesive tape.

Further, when the first power is applied from an outside power source, the drive part operates the gear part and moves the first support unit forward in the direction toward the occupant. At the same time, the winding unit operates the cover so that the cover opens the front side of the first support unit, such that the distance between the occupant and the first support unit is decreased. Therefore, the component such as the electronic component, the accessory, the table, or a combination thereof may be easily mounted on the first support unit.

On the contrary, when the second power is applied from an outside power source, the drive part operates the gear part and moves the first support unit rearward in the direction opposite to the direction toward the occupant. At the same time, the winding unit operates the cover so that the cover closes the front side of the first support unit. Therefore, it is possible to effectively prevent the cover from interfering with the component such as the electronic component, the accessory, the table, or a combination thereof when the cover is closed in the state in which the component such as the electronic component, the accessory, the table, or a combination thereof is mounted on the first support unit.

In addition, with the first and second magnetic elements having different polarities and the third and fourth magnetic elements having different polarities, the first and second fixing units may effectively restrict the movements of the second and third support units from the cabin of the vehicle.

DETAILED DESCRIPTION

Figure 1:
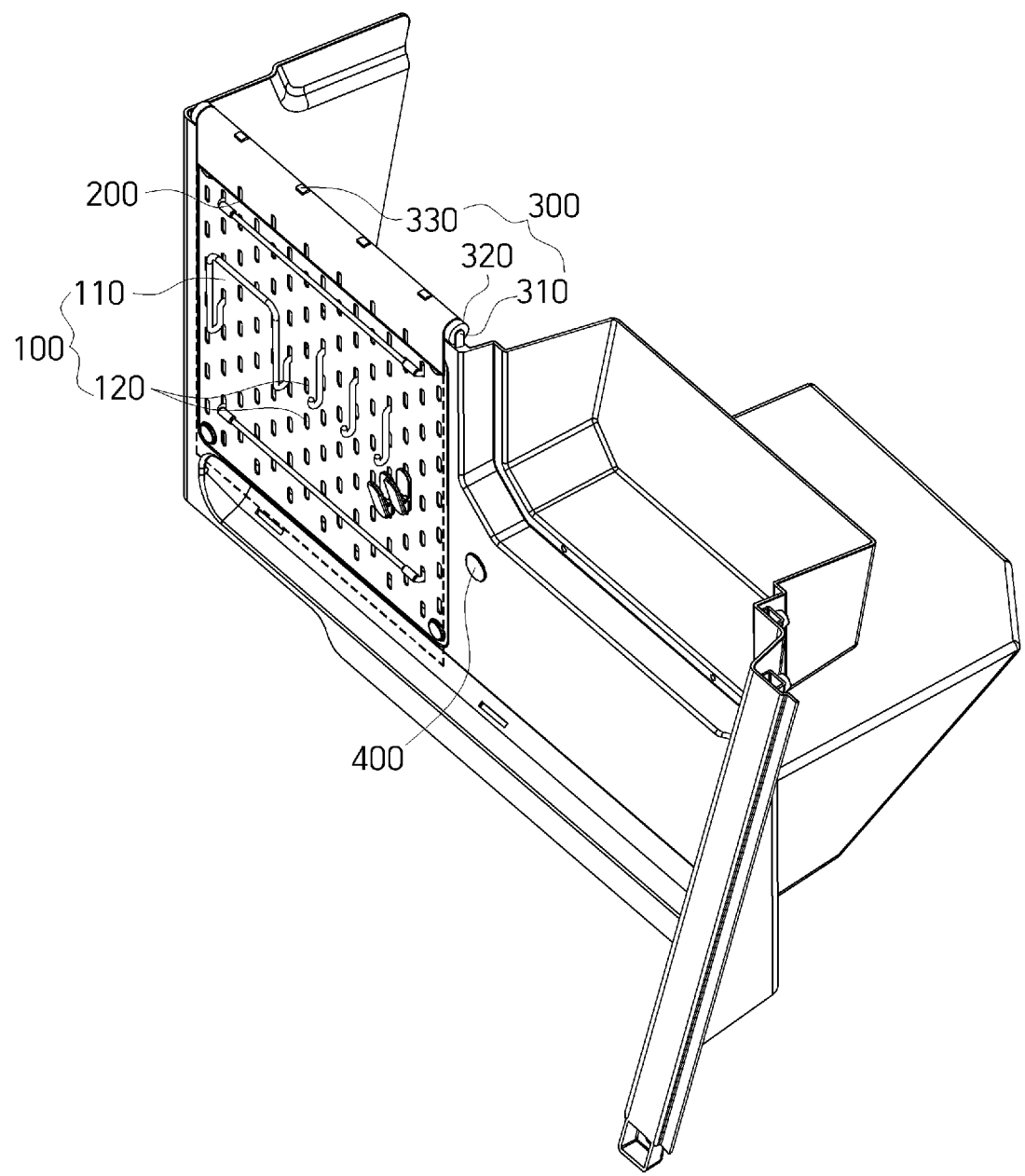
FIG. 1 is a perspective view illustrating a vehicle cradle assembly according to a first embodiment of the present disclosure.

Embodiments of the present disclosure are provided to more completely explain the present disclosure to those skilled in the art. The following embodiments may be modified in various forms, and the scope of the present disclosure is not limited to the following embodiments. The embodiments are provided to make the present disclosure more thorough and complete, and to completely convey the spirit of the present disclosure to those skilled in the art. In addition, in the following drawings, each constituent element may be exaggerated for the convenience and clarity of description. In the drawings, the same reference numerals refer to the same elements. The term "and/or" used in the present specification includes any one, one or more, or all the combinations of listed related items.

The terms used in the present specification are for explaining the particular embodiments, not for limiting the present disclosure.

The singular expressions used in the present specification may include the plural expressions unless the context clearly dictates otherwise. The terms "comprise (include)" and/or "comprising (including)" used in the present specification are intended to specify the presence of the mentioned shapes, numbers, steps, operations, members, elements, and/or groups thereof, but do not exclude presence or addition of one or more other shapes, numbers, steps, operations, members, elements, and/or groups thereof.

Hereinafter, the embodiments of the present disclosure will be described in detail with reference to the accompanying drawings.

Meanwhile, the present disclosure may provide a vehicle cradle assembly configured to hold convenience items required for occupants and fixed to an inner surface of a cabin of a shared mobility vehicle such as a purpose-built vehicle or a robot taxi released with the development of autonomous driving technologies.

First Embodiment

Figure 2:
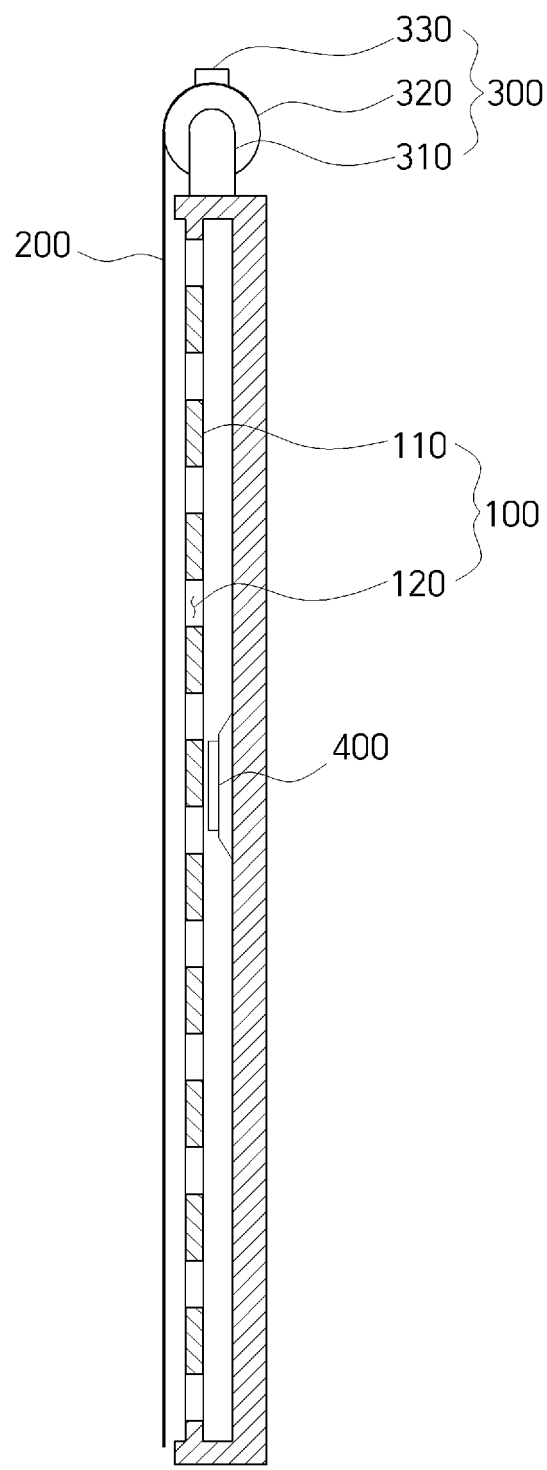
FIG. 2 is a schematic view illustrating a cross-section of the vehicle cradle assembly according to the first embodiment of the present disclosure.
Figure 3:
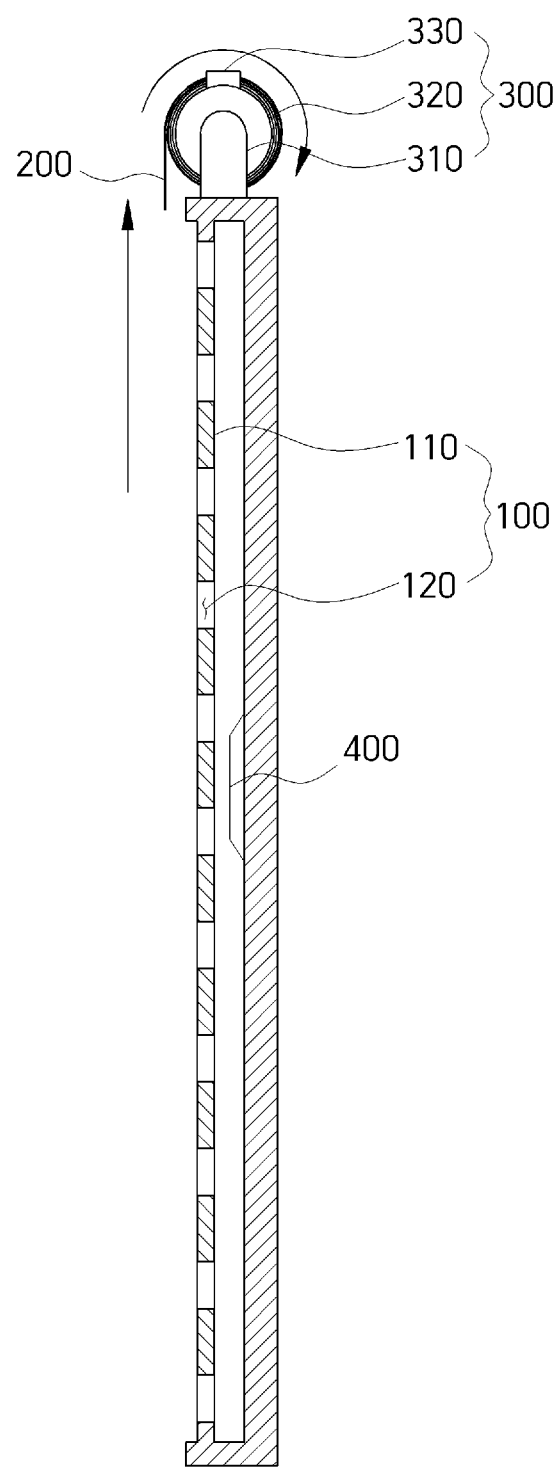
FIG. 3 is a schematic view illustrating a process of operating the vehicle cradle assembly according to the first embodiment of the present disclosure.

FIG. 1 is a perspective view illustrating a vehicle cradle assembly according to a first embodiment of the present disclosure, FIG. 2 is a schematic view illustrating a cross-section of the vehicle cradle assembly according to the first embodiment of the present disclosure, and FIG. 3 is a schematic view illustrating a process of operating the vehicle cradle assembly according to the first embodiment of the present disclosure.

Referring to FIGS. 1 to 3, a vehicle cradle assembly according to a first embodiment of the present disclosure is configured to hold an electronic component, or an accessory, and a combination thereof and includes a first support unit 100, a cover 200, a winding unit 300, and a button unit 400.

The first support unit 100 is provided on an inner surface of a cabin of a vehicle and holds an electronic component, an accessory, or a combination thereof of a vehicle occupant.

In addition, components such as a table that allows the occupant to perform simple work or eat a simple meal in a cabin in a shared mobility vehicle such as a robot taxi and a PBV may be mounted on the first support unit 100.

In this case, the electronic components may include a navigation system, a mobile phone, and the like. The accessories may include an air freshener and the like. However, the present disclosure is not limited thereto.

Further, specifically, the first support unit 100 may be integrally fixed to a crash pad that defines a front surface of the cabin of the vehicle in a direction in which the vehicle travels.

Therefore, since the first support unit 100 is integrally fixed to the crash pad of the vehicle, the component such as the electronic component, the accessory, and the table may be securely mounted on the first support unit 100.

Specifically, the first support unit 100 includes a body portion 110 and a fastening portion 120.

The body portion 110 defines a body of the first support unit 100. The fastening portion 120 is provided in plural, and the plurality of fastening portions 120 is disposed while penetrating the body portion 110.

As illustrated in FIG. 1, the components such as the electronic component, the accessory, the table, or a combination thereof are fastened to the fastening portions 120.

That is, the component such as the electronic component, the accessory, the table, or a combination thereof has a hook-shaped ring so as to be fastened to the fastening portion 120 or is coupled to a separate component such as a hook-shaped ring.

For this reason, the component such as the electronic component, the accessory, the table, or a combination thereof may be easily mounted on the first support unit 100 through the fastening portion 120.

Therefore, various types of accessories may be easily applied to the cabin of the vehicle through customization. Further, it is possible to prevent damage to and breakage of the components caused when the accessory is frequently attached or detached by using an adhesive tape.

In particular, the component such as the electronic component, the accessory, the table, or a combination thereof is mounted on the first support unit 100 fixed to the crash pad of the vehicle, such that the component is indirectly mounted on the crash pad and an air vent of the vehicle. Therefore, it is possible to effectively reduce a risk that the crash pad and the air vent of the vehicle are damaged when the component such as the electronic component, the accessory, the table, or a combination thereof is frequently attached or detached.

The cover 200 is particularly made of woven fabric and disposed on an upper portion of the first support unit 100.

Further, the cover 200 selectively opens or closes a front side of the first support unit 100 while moving in an upward/downward direction.

That is, the cover 200 may close and cover the front side of the first support unit 100 when the occupant does not use the component such as the electronic component, the accessory, the table, or a combination thereof mounted on the first support unit 100 or when the cover 200 covers the component such as the electronic component, the accessory, the table, or a combination thereof mounted on the first support unit 100.

On the contrary, the front side of the first support unit 100 is opened when the component such as the electronic component, the accessory, the table, or a combination thereof mounted on the first support unit 100 is used.

To this end, the cover 200 is coupled to the winding unit 300.

The winding unit 300 is disposed on the upper portion of the first support unit 100 and coupled to an end of the cover 200.

Further, the winding unit 300 operates the cover 200 so that the cover 200 selectively opens or closes the front side of the first support unit 100.

That is, the winding unit 300 allows the cover 200 to open or close the front side of the first support unit 100.

The winding unit 300 includes supports 310, a rotary shaft 320, and first coupling portions 330.

The supports 310 are provided at ends of the first support unit 100 based on a width direction of the vehicle, i.e., ends of an upper portion of the body portion 110 of the first support unit 100.

Further, the support 310 supports the rotary shaft 320 so that the rotary shaft 320 is rotatable.

One end and the other end of the rotary shaft 320 are rotatably coupled to the supports 310, respectively. The rotary shaft 320 rotates forward or backward as power is applied from the outside under the control of the button unit 400.

The first coupling portions 330 are arranged in a longitudinal direction of the rotary shaft 320 and couple an end of the cover 200 to the rotary shaft 320.

The first coupling portion 330 may be configured as a Velcro fastener or woven fabric and have a protrusion shape that penetrates the cover 200.

The first coupling portion 330 may have various fixing structures as long as the first coupling portion 330 may fix the cover 200 to the rotary shaft 320.

Therefore, the end of the cover 200 is fixed to the rotary shaft 320 by the first coupling portions 330. When the rotary shaft 320 is rotated forward by power applied from the outside, the cover 200 is wound around the rotary shaft 320 to open the front side of the first support unit 100.

When the rotary shaft 320 is rotated backward by power applied from the outside, the cover 200 may cover and close the front side of the first support unit 100.

The button unit 400 is fixed inside the cabin of the vehicle. The button unit 400 allows power to be applied to the winding unit 300 under the control of the occupant, thereby controlling the forward or backward rotation of the winding unit.

Meanwhile, in the first embodiment of the present disclosure, the configuration has been described in which the first support unit 100 is fixed to the inner surface of the cabin of the vehicle, more specifically, integrally fixed to the crash pad. However, in a modified example of the first embodiment of the present disclosure, the first support unit 100 may be attached to or detached from the inner surface of the cabin.

Figure 4:
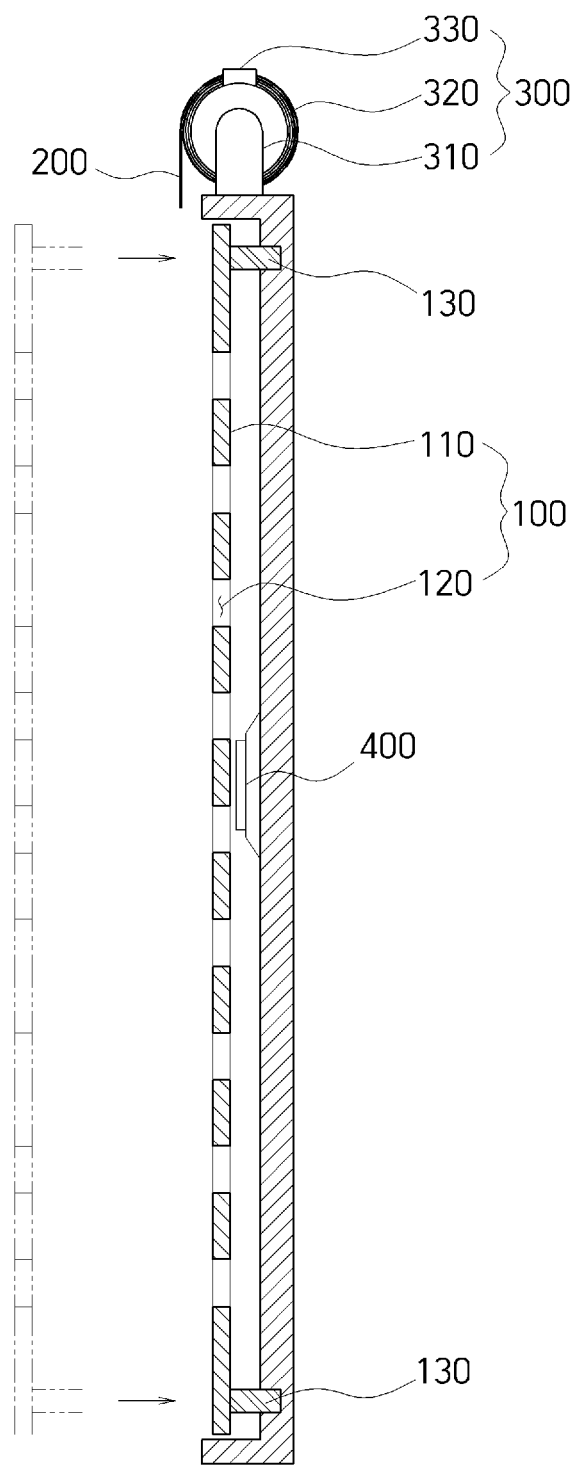
FIG. 4 is a schematic view illustrating a modified example of the vehicle cradle assembly according to the first embodiment of the present disclosure.

FIG. 4 is a schematic view illustrating a modified example of the vehicle cradle assembly according to the first embodiment of the present disclosure.

The components identical to the components described in the above-mentioned embodiment will be designated by the same reference numerals, and a specific description thereof will be omitted.

Referring to FIG. 4, as a modified example of the first embodiment, the first support unit 100 may further include a coupling protrusion 130.

The coupling protrusion 130 extends from a rear surface of the body portion 110 of the first support unit 100 in a direction opposite to a direction toward an occupant compartment.

Further, the coupling protrusion 130 is fixed to a structure having a groove and provided on the inner surface of the cabin of the vehicle.

More specifically, the coupling protrusion 130 may be fixed to a structure having a groove and provided on the inner surface of the cabin, such as an air vent of the vehicle.

Therefore, the coupling protrusion 130 may be easily attached to or detached from the inner surface of the cabin depending on whether the occupant uses the first support unit 100.

Second Embodiment

Figure 5:
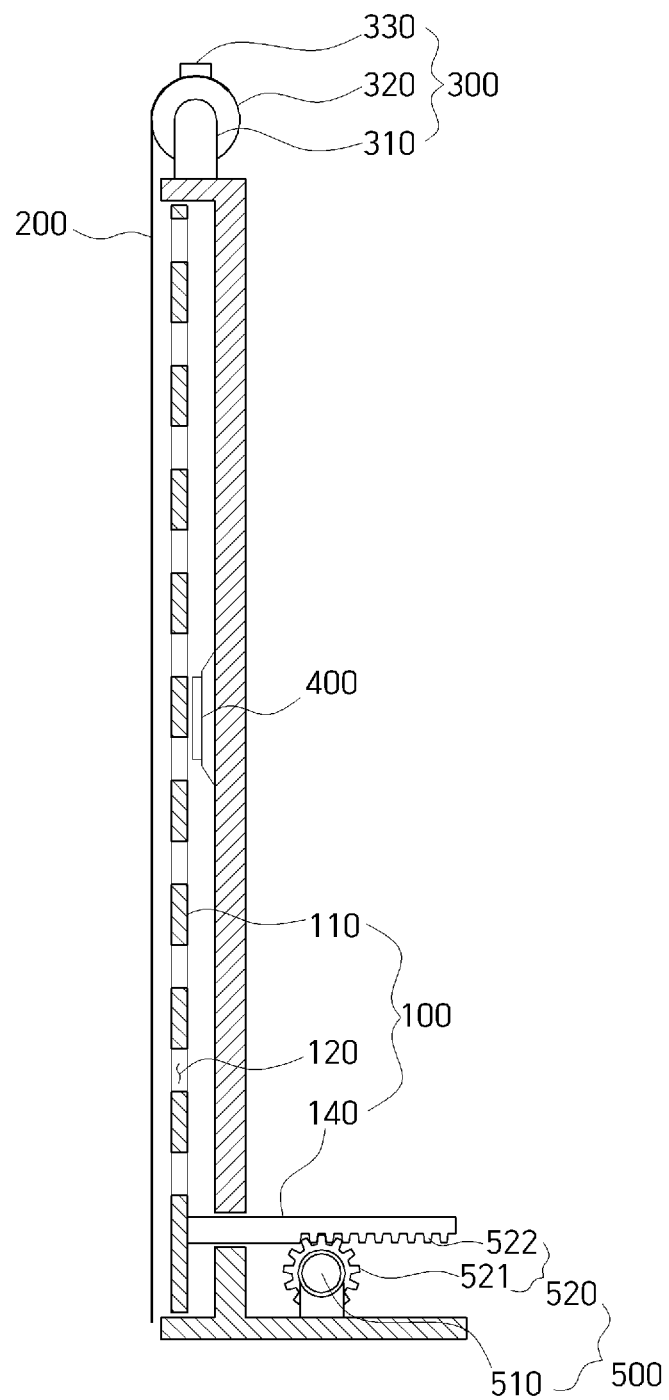
FIG. 5 is a schematic view illustrating a cross-section of a vehicle cradle assembly according to a second embodiment of the present disclosure.
Figure 6:
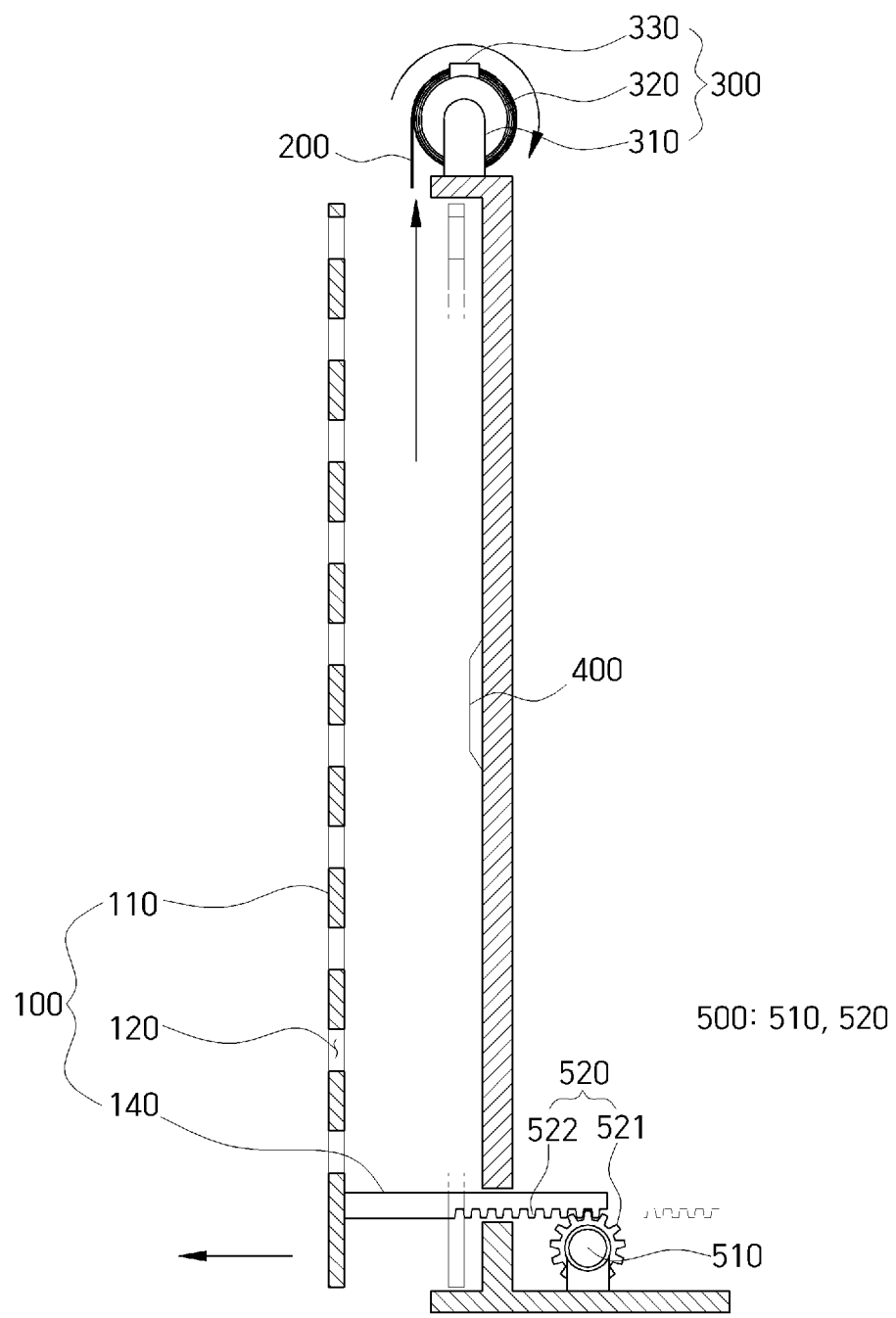
FIG. 6 is a schematic view illustrating a process of operating the vehicle cradle assembly according to the second embodiment of the present disclosure.

FIG. 5 is a schematic view illustrating a cross-section of a vehicle cradle assembly according to a second embodiment of the present disclosure, and FIG. 6 is a schematic view illustrating a process of operating the vehicle cradle assembly according to the second embodiment of the present disclosure.

The components identical to the components described in the above-mentioned embodiment will be designated by the same reference numerals, and a specific description thereof will be omitted.

Referring to FIGS. 5 and 6, a vehicle cradle assembly according to a second embodiment of the present disclosure is configured to hold a component such as an electronic component, an accessory, and a combination thereof and includes a first support unit 100, a cover 200, a winding unit 300, an operation unit 500, and a button unit 400.

The first support unit 100 is provided on an inner surface of a cabin of a vehicle and holds an electronic component, an accessory, or a combination thereof of a vehicle occupant.

In addition, components such as a table that allows the occupant to perform simple work or eat a simple meal in a cabin in a vehicle may be mounted on the first support unit 100.

The first support unit 100 includes a body portion 110, a fastening portion 120, and a sliding portion 140.

The body portion 110 defines a body of the first support unit 100. The fastening portion 120 is penetratively formed in the body portion 110, and the component such as the electronic component, the accessory, the table, or a combination thereof is fastened to the fastening portion 120.

That is, the component such as the electronic component, the accessory, the table, or a combination thereof has a hook-shaped ring so as to be fastened to the fastening portion 120 or is coupled to a separate component such as a hook-shaped ring.

The sliding portion 140 extends from a rear surface of the body portion 110 in a direction opposite to the direction toward the occupant compartment. The sliding portion 140 is slidably coupled to the inner surface of the cabin of the vehicle.

Further, the sliding portion 140 may be moved forward or rearward while sliding from the inner surface of the cabin by the operation unit 500.

The cover 200 is particularly made of woven fabric and disposed on an upper portion of the first support unit 100.

Further, the cover 200 selectively opens or closes a front side of the first support unit 100 while moving in the upward/downward direction.

That is, the cover 200 may close and cover the front side of the first support unit 100 when the occupant does not use the component such as the electronic component, the accessory, the table, or a combination thereof mounted on the first support unit 100 or when the cover 200 covers the component such as the electronic component, the accessory, the table, or a combination thereof mounted on the first support unit 100.

On the contrary, the front side of the first support unit 100 is opened when the component such as the electronic component, the accessory, the table, or a combination thereof mounted on the first support unit 100 is used.

To this end, the cover 200 is coupled to the winding unit 300.

The winding unit 300 is disposed on the upper portion of the first support unit 100 and coupled to an end of the cover 200.

Further, the winding unit 300 operates the cover 200 so that the cover 200 selectively opens or closes the front side of the first support unit 100.

That is, the winding unit 300 allows the cover 200 to open or close the front side of the first support unit 100.

The operation unit 500 is coupled to the first support unit 100 and allows the first support unit 100 to move forward or rearward relative to the cabin of the vehicle.

The operation unit 500 includes a gear part 520 and a drive part 510.

The gear part 520 is provided at an end of the sliding portion 140 and allows the sliding portion 140 to be moved forward or rearward by power of the drive part 510.

The gear part 520 includes a pinion gear 521 and a rack gear 522.

The pinion gear 521 is accommodated in the inner surface of the cabin of the vehicle and connected to the drive part 510, such that the pinion gear 521 rotates by receiving power from the drive part 510.

The rack gear 522 is provided at an end of the sliding portion 140 and engages the pinion gear 521, thereby moving the sliding portion 140 in a horizontal direction.

The drive part 510 is disposed on the inner surface of the cabin of the vehicle and coupled to the gear part 520.

Further, when power is applied from the outside, the drive part 510 operates the gear part 520 and moves the sliding portion 140 forward or rearward.

Specifically, when first power is applied from the outside, the drive part 510 operates the gear part 520 and moves the first support unit 100 forward in the direction toward the occupant.

Further, at the same time, the winding unit 300 operates the cover 200 so that the cover 200 opens the front side of the first support unit 100.

Therefore, as a distance between the occupant and the first support unit 100 is decreased, the occupant may easily mount the component such as the electronic component, the accessory, the table, or a combination thereof on the first support unit 100.

On the contrary, when second power is applied from the outside, the drive part 510 operates the gear part 520 and moves the first support unit 100 rearward in the direction opposite to the direction toward the occupant.

Further, at the same time, the winding unit operates the cover 200 so that the cover 200 closes the front side of the first support unit 100.

Therefore, the operation unit 500 may effectively prevent the cover 200 from interfering with the component such as the electronic component, the accessory, the table, or a combination thereof when the cover 200 is closed in the state in which the component such as the electronic component, the accessory, the table, or a combination thereof is mounted on the first support unit 100.

The button unit 400 is fixed inside the cabin of the vehicle. The button unit 400 allows power to be applied to the winding unit 300 under the control of the occupant, thereby controlling the forward or backward rotation of the winding unit.

The button unit 400 may include a first button part 400 configured to apply the first power to the operation unit 500 and the winding unit 300, and a second button part 400 configured to apply the second power.

In addition, the button unit 400 may be configured as a single button unit and alternately apply the first power and the second power to the operation unit 500 and the winding unit 300 in a toggle switch manner.

Third Embodiment

Figure 7:
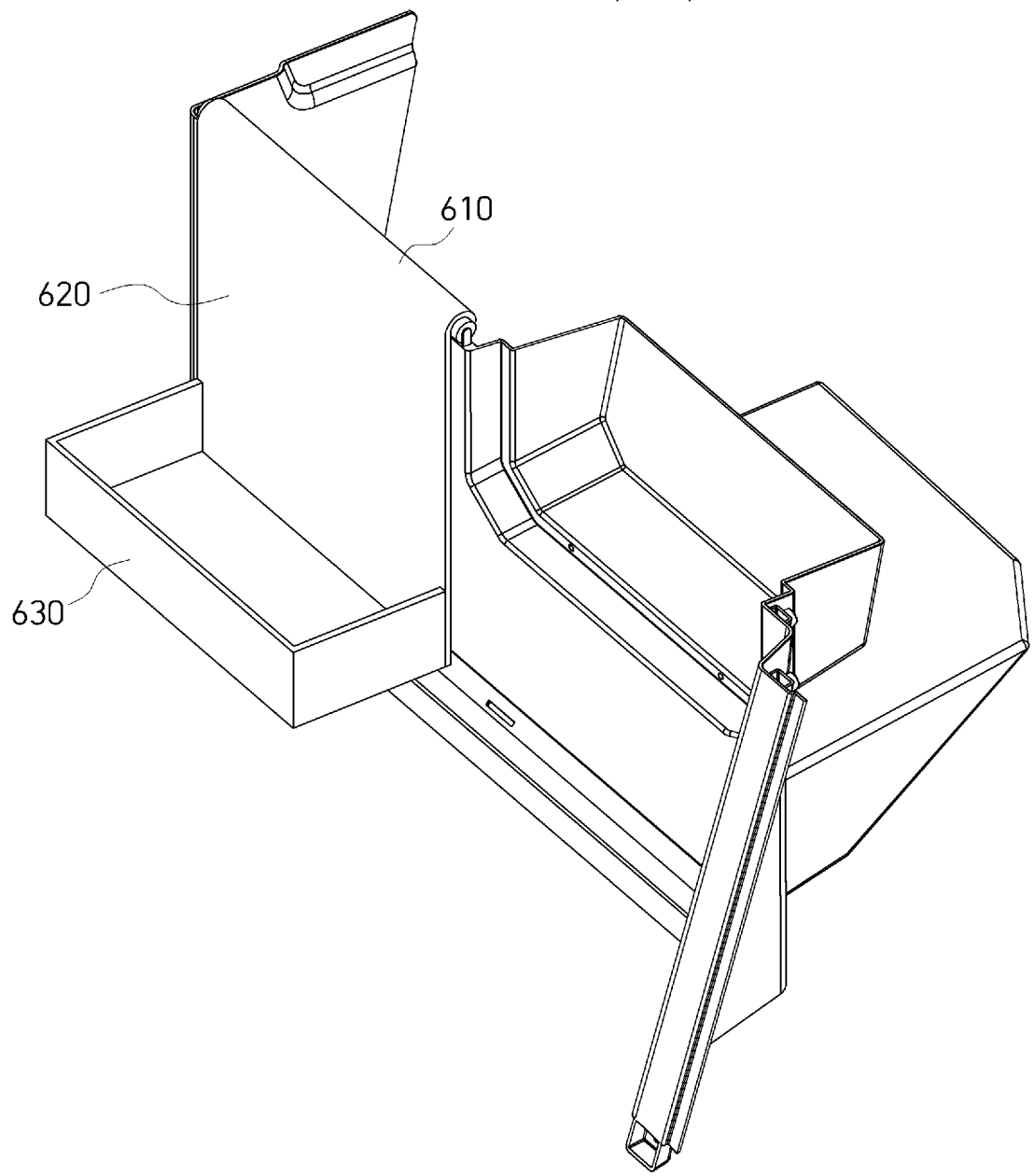
FIG. 7 is a perspective view illustrating a vehicle cradle assembly according to a third embodiment of the present disclosure.
Figure 8:
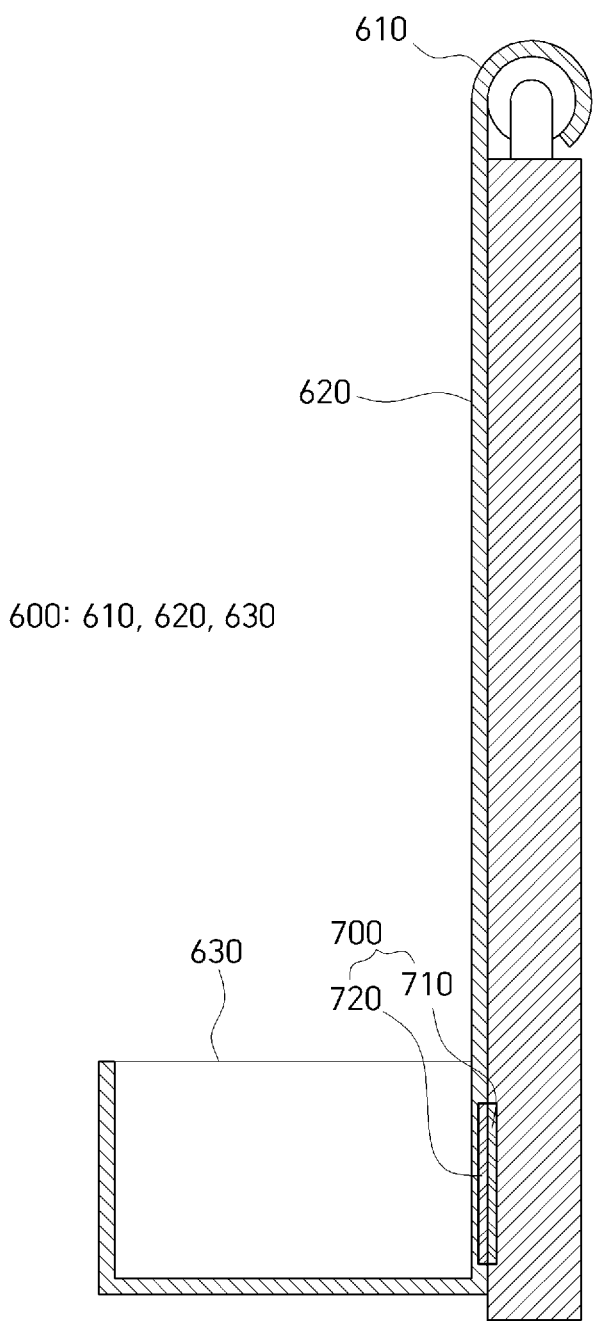
FIG. 8 is a schematic view illustrating a cross-section of the vehicle cradle assembly according to the third embodiment of the present disclosure.

FIG. 7 is a perspective view illustrating a vehicle cradle assembly according to a third embodiment of the present disclosure, and FIG. 8 is a schematic view illustrating a cross-section of the vehicle cradle assembly according to the third embodiment of the present disclosure.

The components identical to the components described in the above-mentioned embodiment will be designated by the same reference numerals, and a specific description thereof will be omitted.

Referring to FIGS. 7 and 8, a vehicle cradle assembly according to a third embodiment of the present disclosure is configured to hold a component such as an electronic component, an accessory, and a combination thereof and includes a second support unit 600 and a first fixing unit 700.

The second support unit 600 is particularly made of a material such as steel having rigidity. An upper portion of the second support unit 600 is fixed to the cabin of the vehicle.

Further, the component such as the electronic component, the accessory, the table, or a combination thereof is mounted on the second support unit 600.

The second support unit 600 includes a second coupling portion 610, an extension portion 620, and a mounting portion 630.

The second coupling portion 610 is fixed to the cabin of the vehicle and allows the second support unit 600 to be fixed to the inner surface of the cabin of the vehicle.

The extension portion 620 extends downward from the second coupling portion 610 and covers the inner surface of the cabin of the vehicle.

The mounting portion 630 is bent from a lower end of the extension portion 620 in the direction toward the occupant and holds the component such as the electronic component, the accessory, the table, or a combination thereof.

Therefore, the component such as the electronic component, the accessory, the table, or a combination thereof may be easily mounted on the cabin of the vehicle by means of the mounting portion 630 of the second support unit 600.

Therefore, various types of accessories may be easily applied to the cabin of the vehicle through customization. Further, it is possible to prevent damage to and breakage of the components caused when the accessory is frequently attached or detached by using an adhesive tape.

In particular, the component such as the electronic component, the accessory, the table, or a combination thereof is mounted on the mounting portion 630 of the second support unit 600 fixed to the crash pad of the vehicle, such that the component is indirectly mounted on the crash pad and an air vent of the vehicle. Therefore, it is possible to effectively reduce a risk that the crash pad and the air vent of the vehicle are damaged when the component such as the electronic component, the accessory, the table, or a combination thereof is frequently attached or detached.

The first fixing unit 700 is fixed to the cabin of the vehicle and the second support unit 600 and restricts a movement of the second support unit 600 from the cabin of the vehicle by means of the mutual coupling.

The first fixing unit 700 includes a first magnetic element 710 and a second magnetic element 720.

The first magnetic element 710 is fixed to the inner surface of the cabin of the vehicle. The second magnetic element 720 is fixed to the second support unit 600, i.e., a position on the extension portion 620 corresponding to the first magnetic element 710.

Further, the first magnetic element 710 and the second magnetic element 720 have different polarities.

Therefore, since the first magnetic element 710 and the second magnetic element 720 have different polarities, an attractive force is generated to allow the first magnetic element 710 and the second magnetic element 720 to pull each other.

Therefore, with the first and second magnetic elements 710 and 720 having different polarities, the first fixing unit 700 may effectively restrict the movement of the second support unit 600 from the cabin of the vehicle.

Fourth Embodiment

Figure 9:
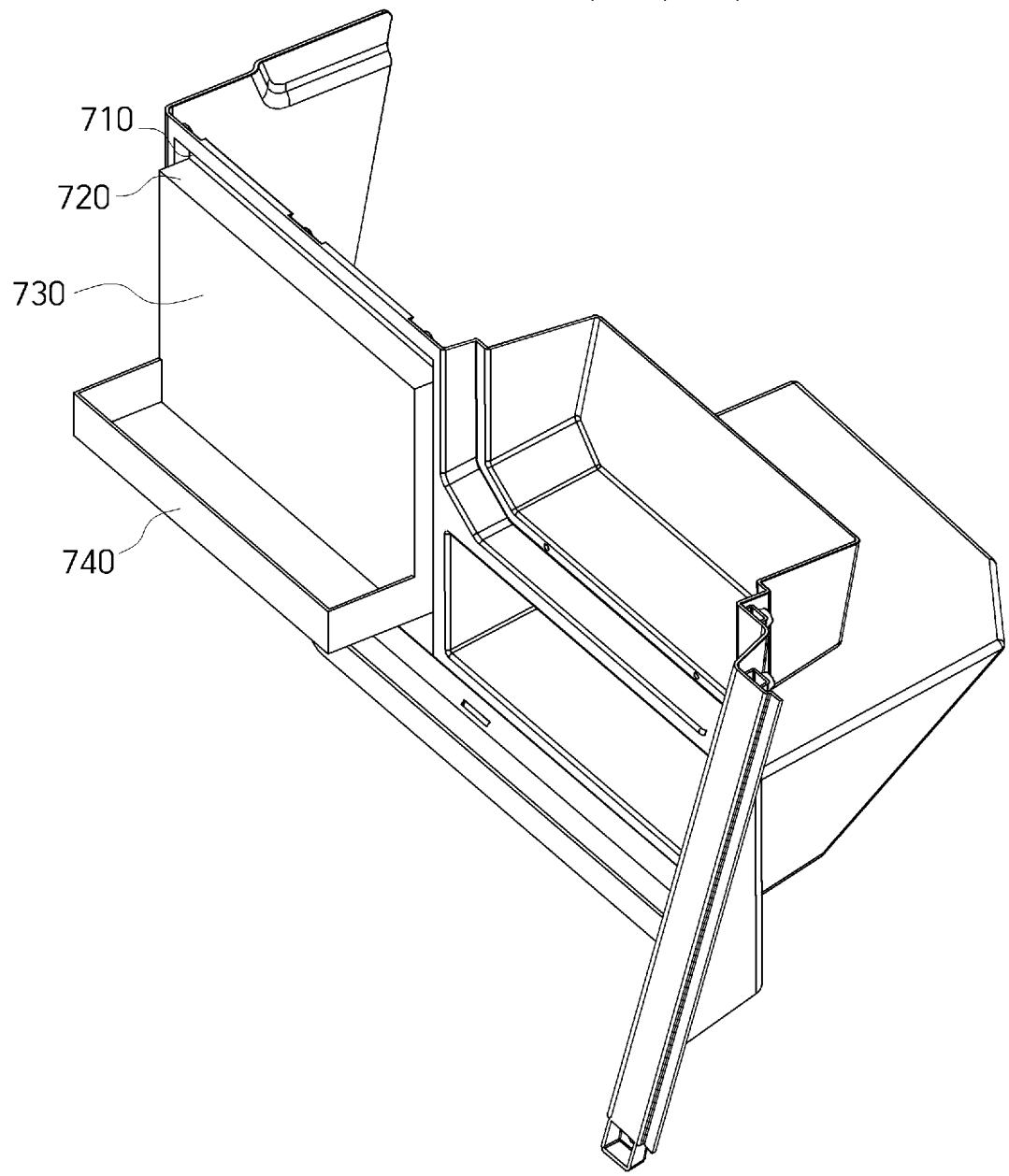
FIG. 9 is a perspective view illustrating a vehicle cradle assembly according to a fourth embodiment of the present disclosure.
Figure 10:
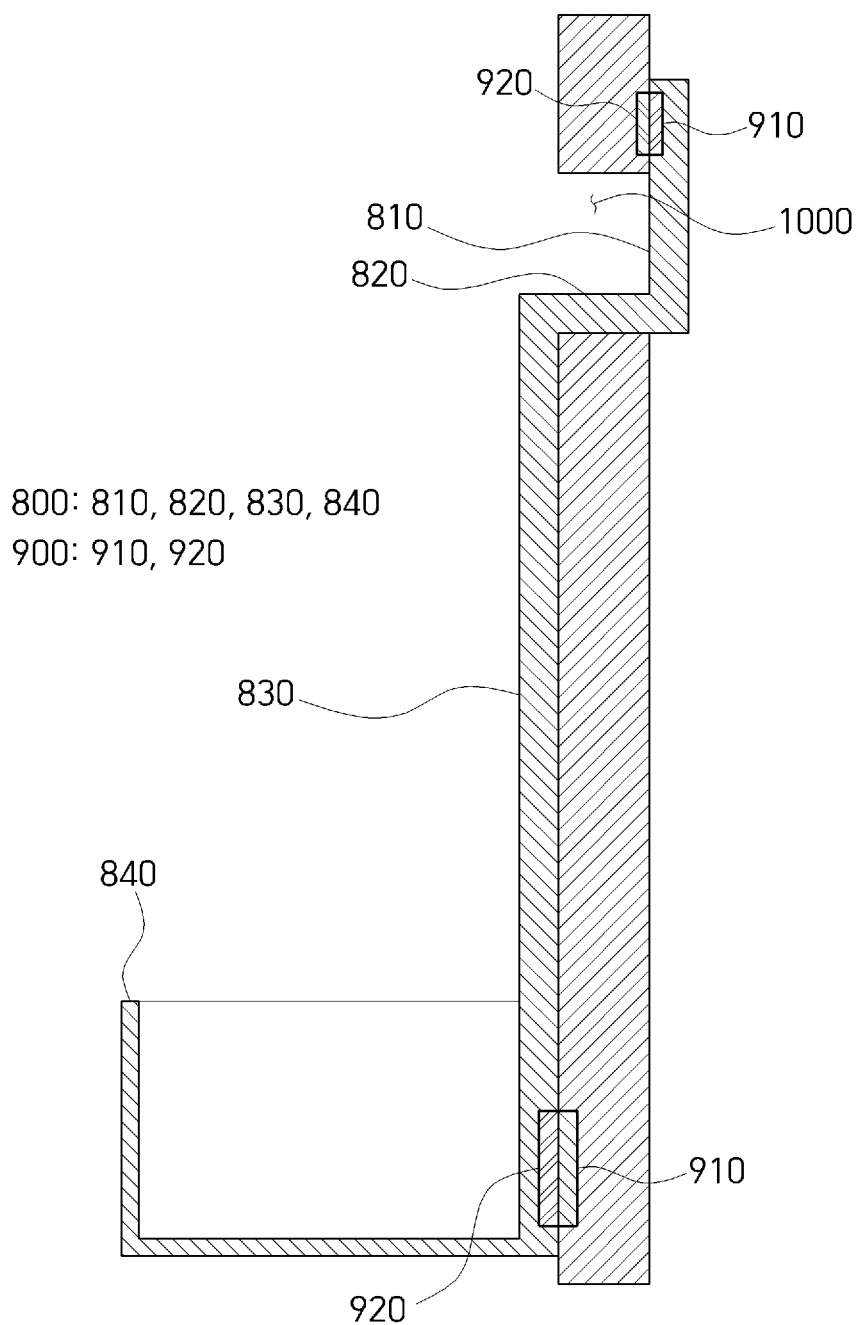
FIG. 10 is a schematic view illustrating a cross-section of the vehicle cradle assembly according to the fourth embodiment of the present disclosure.

FIG. 9 is a perspective view illustrating a vehicle cradle assembly according to a fourth embodiment of the present disclosure, and FIG. 10 is a schematic view illustrating a cross-section of the vehicle cradle assembly according to the fourth embodiment of the present disclosure.

The components identical to the components described in the above-mentioned embodiment will be designated by the same reference numerals, and a specific description thereof will be omitted.

Referring to FIGS. 9 and 10, a vehicle cradle assembly according to a fourth embodiment of the present disclosure is configured to hold a component such as an electronic component, an accessory, and a combination thereof and includes a third support unit 800 and a second fixing unit 900.

The third support unit 800 is coupled to a coupling groove 1000 formed in an inner surface of the cabin of the vehicle and holds the electronic component, the accessory, and a combination thereof.

The third support unit 800 includes a first vertical portion 810, a first horizontal portion 820, a second vertical portion 830, and a second horizontal portion 840.

The first vertical portion 810 adjoins an inner peripheral surface of the coupling groove 1000 formed in the inner surface of the cabin of the vehicle. The first horizontal portion 820 is bent and extends from a lower end of the first vertical portion 810 in the direction toward the occupant while penetrating the coupling groove 1000.

Further, the second vertical portion 830 is bent and extends downward from an end of the first horizontal portion 820 based on the direction toward the occupant. The second horizontal portion 840 is bent and extends in the direction toward the occupant from a lower end of the second vertical portion 830.

Further, the component such as the electronic component, the accessory, the table, or a combination thereof is mounted on the second horizontal portion 840.

Therefore, the component such as the electronic component, the accessory, the table, or a combination thereof may be easily mounted on the cabin of the vehicle by means of the second horizontal portion 840 of the third support unit 800.

Therefore, various types of accessories may be easily applied to the cabin of the vehicle through customization. Further, it is possible to prevent damage to and breakage of the components caused when the accessory is frequently attached or detached by using an adhesive tape.

In particular, the component such as the electronic component, the accessory, the table, or a combination thereof is mounted on the second horizontal portion 840 of the third support unit 800 fixed to the crash pad of the vehicle, such that the component is indirectly mounted on the crash pad and an air vent of the vehicle. Therefore, it is possible to effectively reduce a risk that the crash pad and the air vent of the vehicle are damaged when the component such as the electronic component, the accessory, the table, or a combination thereof is frequently attached or detached.

The second fixing unit 900 is fixed to the cabin of the vehicle and the third support unit 800 and restricts a movement of the third support unit 800 from the cabin of the vehicle by means of the mutual coupling.

The second fixing unit 900 includes a third magnetic element 910 and a fourth magnetic element 920.

The third magnetic element 910 is provided as a pair of third magnetic elements 910. The pair of third magnetic elements 910 is respectively coupled to an upper portion based on the coupling groove 1000 and a lower portion based on the coupling groove 1000 formed in the inner surface of the cabin of the vehicle.

More specifically, the third magnetic elements 910 are respectively coupled to a rear surface of the upper portion based on the coupling groove 1000 and a front surface of the lower portion based on the coupling groove 1000 formed in the inner surface of the cabin of the vehicle.

The fourth magnetic element 920 is provided as a pair of fourth magnetic elements 920. The pair of fourth magnetic elements 920 is respectively coupled to a region of the first vertical portion 810 of the third support unit 800 that corresponds to the third magnetic element 910 coupled to the upper portion based on the coupling groove 1000 and a region of the second vertical portion 830 of the third support unit 800 that corresponds to the third magnetic element 910 coupled to the lower portion based on the coupling groove 1000.

Further, the third magnetic element 910 and the fourth magnetic element 920 have different polarities.

Therefore, since the third magnetic element 910 and the fourth magnetic element 920 have different polarities, an attractive force is generated to allow the third magnetic element 910 and the fourth magnetic element 920 to pull each other.

Therefore, with the third and fourth magnetic elements 910 and 920 having different polarities, the second fixing unit 900 may effectively restrict the movement of the third support unit 800 from the cabin of the vehicle.

Accordingly, the embodiments disclosed in the present specification should be considered as being not restrictive but illustrative. The scope of the present disclosure is defined by claims rather than the above-mentioned description, and all the differences in the equivalent scope thereto should be construed as falling within the scope of the present disclosure.

What is claimed is:

1. A vehicle cradle assembly for holding an electronic component, an accessory, and a combination thereof, the vehicle cradle assembly comprising:
   a first support unit disposed on an inner surface of a cabin of a vehicle and configured to support the electronic component, the accessory, and the combination thereof;
   a cover disposed on an upper portion of the first support unit and configured to selectively open or close a front side of the first support unit;
   a winding unit disposed on the upper portion of the first support unit, coupled to an end of the cover, and configured to operate the cover to selectively open or close the front side of the first support unit; and
   a button unit fixed to the inner surface of the cabin of the vehicle and configured to control an operation of the winding unit by applying power to the winding unit.

2. The vehicle cradle assembly of claim 1, wherein the first support unit is fixed to a crash pad of the vehicle.

3. The vehicle cradle assembly of claim 1, wherein the first support unit comprises:
   a body portion; and
   a plurality of fastening portions penetratively formed in the body portion so that the electronic component, the accessory, and the combination thereof are fastened to the fastening portions.

4. The vehicle cradle assembly of claim 1, wherein the winding unit comprises:
   supports disposed at ends of the upper portion of the first support unit in a width direction of the vehicle;
   a rotary shaft having a first end and a second end respectively and rotatably coupled to the supports and configured to rotate forward or backward under a control of the button unit; and
   first coupling portions arranged in a longitudinal direction of the rotary shaft and configured to couple the end of the cover to the rotary shaft.

5. The vehicle cradle assembly of claim 3, wherein the first support unit further comprises a coupling protrusion extending from a rear surface of the body portion in a direction opposite to a direction toward an occupant compartment, the coupling protrusion being coupled to the inner surface of the cabin of the vehicle.

6. The vehicle cradle assembly of claim 5, wherein the coupling protrusion is fixed to an air vent of the vehicle.

7. A vehicle cradle assembly for holding an electronic component, an accessory, and a combination thereof, the vehicle cradle assembly comprising:
- a first support unit slidably coupled to an inner surface of a cabin of a vehicle and configured to support the electronic component, the accessory, and the combination thereof;
- a cover disposed on an upper portion of the first support unit and configured to selectively open or close a front side of the first support unit;
- a winding unit disposed on the upper portion of the first support unit, coupled to an end of the cover, and configured to operate the cover to selectively open or close the front side of the first support unit;
- an operation unit coupled to the first support unit and configured to move the first support unit forward or rearward relative to the cabin of the vehicle; and
- a button unit fixed to the inner surface of the cabin of the vehicle and configured to control an operation of the winding unit and an operation of the operation unit by applying power to the winding unit and the operation unit.

8. The vehicle cradle assembly of claim 7, wherein when second power is applied from an outside power source and the operation unit moves the first support unit rearward in a direction opposite to a direction toward an occupant, the winding unit operates the cover to close the first support unit.

9. The vehicle cradle assembly of claim 7, wherein the first support unit comprises:
- a body portion;
- a plurality of fastening portions penetratively formed in the body portion so that the electronic component or the accessory is fastened to the fastening portion; and
- a sliding portion extending from a rear surface of the body portion in a direction opposite to a direction toward an occupant compartment and slidably coupled to the inner surface of the cabin of the vehicle.

10. The vehicle cradle assembly of claim 9, wherein the operation unit comprises:
- a drive part disposed on the inner surface of the cabin of the vehicle and configured to move the sliding portion forward or rearward when power is applied from an outside power source; and
- a gear part connected to the drive part and configured to be operated by an operation of the drive part.

11. The vehicle cradle assembly of claim 10, wherein the gear part comprises:
- a pinion gear connected to the drive part and configured to rotate by receiving power from the drive part; and
- a first rack gear disposed at an end of the sliding portion and configured to engage with the pinion gear and move the sliding portion in a horizontal direction.

12. A vehicle cradle assembly for holding an electronic component, an accessory, and a combination thereof, the vehicle cradle assembly comprising:
- a support unit having an upper portion fixed to a cabin of a vehicle and configured such that the electronic component, the accessory, and the combination thereof are mounted on the support unit; and
- a first fixing unit coupled to the cabin of the vehicle and the support unit and configured to restrict a movement of the support unit from the cabin of the vehicle by means of mutual coupling, wherein the support unit comprises:
- a coupling portion fixed to the cabin of the vehicle;
- an extension portion extending downward from the coupling portion; and
- a mounting portion bent from a lower end of the extension portion in a direction toward an occupant and configured to hold the electronic component, the accessory, and the combination thereof.

13. The vehicle cradle assembly of claim 12, wherein the first fixing unit comprises:
- a first magnetic element fixed to the inner surface of the cabin of the vehicle; and
- a second magnetic element fixed to a position on the support unit corresponding to a position of the first magnetic element.

\* \* \* \* \*